(12) United States Patent
Belakshe et al.

(10) Patent No.: US 9,784,072 B2
(45) Date of Patent: Oct. 10, 2017

(54) REMOVING CURED RESINS FROM SUBTERRANEAN FORMATIONS AND COMPLETIONS

(71) Applicant: Halliburton Energy Services, Inc., Houston, TX (US)

(72) Inventors: Ravikant S. Belakshe, Pune (IN); Amit Chandrakant Agrawal, Pune (IN); Chetan Prakash, Pune (IN); Sumit Ramesh Songire, Pune (IN); Amar Deep Pathak, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 37 days.

(21) Appl. No.: 14/907,727

(22) PCT Filed: Aug. 30, 2013

(86) PCT No.: PCT/US2013/057655
§ 371 (c)(1),
(2) Date: Jan. 26, 2016

(87) PCT Pub. No.: WO2015/030813
PCT Pub. Date: Mar. 5, 2015

(65) Prior Publication Data
US 2016/0160610 A1 Jun. 9, 2016

(51) Int. Cl.
| | | |
|---|---|---|
| E21B 37/06 | (2006.01) | |
| C09K 8/52 | (2006.01) | |
| C09K 8/524 | (2006.01) | |
| E21B 37/08 | (2006.01) | |
| C09K 8/035 | (2006.01) | |
| C09K 8/508 | (2006.01) | |
| C09K 8/575 | (2006.01) | |
| E21B 33/138 | (2006.01) | |

(52) U.S. Cl.
CPC .............. *E21B 37/08* (2013.01); *C09K 8/035* (2013.01); *C09K 8/508* (2013.01); *C09K 8/524* (2013.01); *C09K 8/5751* (2013.01); *E21B 33/138* (2013.01); *E21B 37/06* (2013.01)

(58) Field of Classification Search
CPC E21B 37/08; E21B 37/06; C09K 8/52; C09K 8/524
See application file for complete search history.

(56) References Cited

U.S. PATENT DOCUMENTS

| | | |
|---|---|---|
| 2,435,239 A | 2/1948 | Schub |
| 4,396,703 A | 8/1983 | Matsumoto et al. |
| 4,508,634 A | 4/1985 | Elepano et al. |
| 4,541,489 A | 9/1985 | Wu |
| 5,106,525 A | 4/1992 | Sullivan |
| 5,288,335 A | 2/1994 | Stevens |
| 5,421,897 A | 6/1995 | Grawe |
| 6,060,439 A | 5/2000 | Doyel et al. |
| 6,090,860 A | 7/2000 | Peters et al. |
| 6,179,931 B1 | 1/2001 | Kobayashi et al. |
| 6,454,868 B1 | 9/2002 | Polakovic et al. |
| 6,962,628 B1 | 11/2005 | Shibata et al. |
| 7,198,681 B2 | 4/2007 | Nguyen et al. |
| 8,105,989 B2 | 1/2012 | Svoboda et al. |
| 8,338,747 B2 | 12/2012 | Kon et al. |
| 8,377,324 B2 | 2/2013 | Fairbourn |
| 8,444,768 B2 | 5/2013 | Quillen et al. |
| 2005/0006096 A1 | 1/2005 | Nguyen et al. |
| 2005/0220743 A1 | 10/2005 | Nojiri et al. |
| 2007/0049510 A1 | 3/2007 | Fujii et al. |
| 2007/0261854 A1 | 11/2007 | Nguyen et al. |
| 2008/0135251 A1 | 6/2008 | Nguyen et al. |
| 2010/0035433 A1 | 2/2010 | Takemiya et al. |
| 2010/0314117 A1 | 12/2010 | Li et al. |
| 2011/0086223 A1 | 4/2011 | Sakamoto et al. |
| 2011/0146997 A1 | 6/2011 | Nguyen et al. |
| 2012/0046212 A1 | 2/2012 | Bourdette et al. |
| 2013/0143403 A1 | 6/2013 | Hong et al. |
| 2014/0027116 A1* | 1/2014 | Suresh ............... C09K 8/56 166/292 |
| 2016/0052845 A1 | 2/2016 | Kawamura et al. |

OTHER PUBLICATIONS

International Search Report and Written Opinion issued in related PCT Application No. PCT/US2013/057655 dated May 19, 2014, 11 pages.
U.S. EPA HPV Challenge Program Revised Submission, y-Butyrolactone, Document No. 201-14672A, Aug. 15, 2003.
International Preliminary Report on Patentability issued in Application No. PCT/US2013/069391, dated May 26, 2016 (7 pages).
International Search Report issued in PCT Application No. PCT/US2013/069391, dated Aug. 21, 2014 (7 pages).
International Preliminary Report on Patentability issued in PCT Application No. PCT/US2013/057655, dated Mar. 10, 2016 (8 pages).
Office Action issued in U.S. Appl. No. 15/028,137, dated Jul. 3, 2017 (18 pages).

* cited by examiner

Primary Examiner — Catherine Loikith
(74) Attorney, Agent, or Firm — Craig W. Roddy; Baker Botts L.L.P.

(57) ABSTRACT

A process for chemically removing cured resin product from subterranean formations in case of inappropriate consolidation, plugging of screens or tubing, and equipment damage. A chemical solvent is introduced to a wellbore where a resin has cured. The resin is contacted with the chemical solvent until the resin at least partially dissolves. The dissolved resin is then removed from the wellbore. The process may also be used to remove consolidated packs consisting of cured resin and particulate materials.

20 Claims, 6 Drawing Sheets

REMOVING CURED RESINS FROM SUBTERRANEAN FORMATIONS AND COMPLETIONS

CROSS-REFERENCE TO RELATED APPLICATION

The present application is a U.S. National Stage Application of International Application No. PCT/US2013/057655 filed Aug. 30, 2013, which is incorporated herein by reference in its entirety for all purposes.

BACKGROUND

The present disclosure provides a method for removing cured resin product from subterranean formations in case of inappropriate consolidation, plugging of screens or tubing, and equipment damage.

Hydrocarbon wells are often located in subterranean zones that contain unconsolidated particulates that may migrate within the subterranean formation with the oil, gas, water, and/or other fluids produced by a well penetrating the subterranean formation. As used herein, the term "unconsolidated particulate," and derivatives thereof, includes loose particulates and particulates bonded with insufficient bond strength to withstand the forces created by the production of fluids through the formation, which may include but are not limited to formation fines and/or proppant particulates. "Formation fine(s)," another term used herein, refers to any loose particles within the portion of the formation, including, but not limited to, formation fines, formation sand, clay particulates, coal fines, and the like. A similar situation can exist in certain wells where particulates referred to as "proppant particulates" may be introduced into the subterranean formation. The proppant particulates may be used in conjunction with hydraulic fracturing to prevent the fractures from fully closing upon the release of hydraulic pressure, forming conductive channels through which fluids may flow to the wellbore.

The presence of these unconsolidated particulates in produced fluids is disadvantageous and undesirable in that the particulates may abrade pumping and other producing equipment and reduce the fluid production capabilities of producing zones. Unconsolidated subterranean zones include those that contain loose particulates and those wherein the bonded particulates have insufficient bond strength to withstand the forces produced by the production of fluids through the zones. "Zone" as used herein simply refers to a portion of the formation and does not imply a particular geological strata or composition.

One way to address the disadvantages caused by unconsolidated particulates is to introduce a resin into the unconsolidated subterranean zone. The term "resin" as used herein refers to any of numerous physically similar polymerized synthetics or chemically modified natural resins including thermoplastic materials and thermosetting materials. In addition to maintaining a relatively solids-free production stream, consolidating particulates also aids in protecting the conductivity of the formation. Such consolidation treatments involve the injection of a liquid resin into the formation and thereafter causing the resin to cure to an infusible state called as thermosetting. The cured resin cements the sand grains or other unconsolidated particulates together by providing high strength, and, ideally, retaining high percentage of initial formation permeability ("Regain Permeability").

In certain cases, achieving high consolidation strength can be difficult and may require additional resin to account for large amounts of unconsolidated particles. However, if an excess amount of resin composition is pumped to achieve high strength or if there is a delay in the pumping schedule, the resin can cure in undesirable places, including the formation, screens, tubing, and other equipment. The excess resin can also block the formation's permeable channels and reduce the regain permeability. Similarly, consolidated packs of cured resin and particulate can form in undesirable places. The cured resin or consolidated packs can lead to permanent damage to these locations.

Once resin is cured, it can be difficult to remove. Traditionally, a drill bit or similar mechanical method is used to remove cured resin and consolidated packs remaining in the wellbore or in the subterranean formation. However, using these mechanical methods to remove cured resin presents additional challenges and it is not always possible to remove resin from confined spaces or from the surface of equipment.

BRIEF DESCRIPTION OF THE DRAWINGS

These drawings illustrate certain aspects of some of the embodiments of the present disclosure, and should not be used to limit or define the invention.

FIG. 1 is a series of photographs of certain examples of sand cube dissolution tests and the appearance of the sand cubes at different defined states.

FIG. 6 is a series of photographs of one example of a sandpack without BLO treatment (FIG. 6A) and after a representative treatment with BLO (FIG. 6B).

DESCRIPTION OF PREFERRED EMBODIMENTS

The present disclosure provides a method for removing cured resin product from subterranean formations, for example, in instances of undesired consolidation, plugging of screens or tubing, and equipment damage.

The methods of the present disclosure generally involve using a chemical solvent to remove at least a portion of a cured resin or a consolidated pack comprising cured resin and particulates. The chemical solvents are typically used in liquid form, among other reasons, so they can penetrate confined spaces more easily. One of the potential advantages of the methods of the present disclosure is that the enhanced ease of removing resin may enhance operators' willingness to and/or confidence in using resin system for sand consolidation.

Resins that may be suitable for treatment according to the present disclosure include any resins known in the art that are capable of forming a hardened, consolidated mass. Types of suitable resins include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. It is within the ability of one skilled in the art, with the benefit of this disclosure, to select a suitable resin for use in embodiments of the present disclosure.

Two-Component Epoxy Resins

One resin suitable for treatment according to the present disclosure is a two-component epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include the geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a organosilane coupling agent, a surfactant, an optional hydrolyzable ester for, among other things, breaking gelled fracturing fluid films on the proppant particles, and an optional liquid carrier fluid for, among other things, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be used in the hardenable resin component include, but are not limited to, organic resins such as bisphenol A diglycidyl ether resin, butoxymethyl butyl glycidyl ether resin, bisphenol A-epichlorohydrin resin, polyepoxide resin, novolak resin, polyester resin, phenol-aldehyde resin, urea-aldehyde resin, furan resin, urethane resin, a glycidyl ether resin, and combinations thereof. The hardenable resin used is included in the hardenable resin component in an amount in the range of from about 60% to about 100% by weight of the hardenable resin component. In some embodiments the hardenable resin used is included in the hardenable resin component in an amount of about 70% to about 90% by weight of the hardenable resin component. Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use according to the methods in the present disclosure. Some preferred solvents are those having high flash points (e.g., about 125° F.) because of, among other things, environmental and safety concerns. Such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

As described above, use of a solvent in the hardenable resin component is optional but may be desirable to reduce the viscosity of the hardenable resin component for ease of handling, mixing, and transferring. It is within the ability of one skilled in the art, with the benefit of this disclosure, to determine if and how much solvent is needed to achieve a suitable viscosity. In some embodiments the amount of the solvent used in the hardenable resin component is in the range of from about 0.1% to about 30% by weight of the hardenable resin component. Optionally, the hardenable resin component may be heated to reduce its viscosity, in place of, or in addition to, using a solvent.

Examples of the hardening agents that can be used in the liquid hardening agent component of the two-component consolidation fluids include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl)phenol, and 2-(N2N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F. The hardening agent used is included in the liquid hardening agent component in an amount sufficient to consolidate the coated particulates. In some embodiments, the hardening agent used is included in the liquid hardenable resin component in the range of from about 40% to about 60% by weight of the liquid hardening agent component. In some embodiments, the hardenable resin used is included in the hardenable resin component in an amount of about 45% to about 55% by weight of the liquid hardening agent component.

An organosilane coupling agent may be used, among other things, to act as a mediator to help bond the resin to formation particulates and/or proppant. Any organosilane coupling agent that is compatible with the resin and facilitates the coupling of the resin to the surface of the particulates is suitable for use in the resins that may be treated according to the present disclosure. Examples of organosilane coupling agents include, but are not limited to, N-2-(aminoethyl)-3-aminopropyltrimethoxysilane; 3-glycidoxypropyltrimethoxysilane; γ-aminopropyltriethoxysilane; N-β-(aminoethyl)-γ-aminopropyltrimethoxysilanes, aminoethyl-N-β-(aminoethyl)-γ-aminopropyl-trimethoxysilanes; γ-ureidopropyl-triethoxysilanes; β-(3-4 epoxy-cyclohexyl)-ethyl-trimethoxysilane; and γ-glycidoxypropyltrimethoxysilanes; vinyltrichlorosilane; vinyltris(β-methoxyethoxy)silane; vinyltriethoxysilane; vinyltrimethoxysilane; 3-metacryloxypropyltrimethoxysilane; β-(3,4 epoxycyclohexyl)-ethyltrimethoxysilane; r-glycidoxypropyltrimethoxysilane; r-glycidoxypropylmethylidiethoxysilane; N-β (aminoethyl)-r-aminopropyl-trimethoxysilane; N-β (aminoethyl)-r-aminopropylmethyldimethoxysilane; 3-aminopropyl-triethoxysilane; N-phenyl-r-aminopropyltrimethoxysilane; r-mercaptopropyltrimethoxysilane; Vinyltrichlorosilane; vinyltris(β-methoxyethoxy)silane; Vinyltrimethoxysilane; r-metacryloxypropyltrimethoxysilane; β-(3,4 epoxycyclohexyl)-ethyltrimethoxysilane; r-glycidoxypropyltrimethoxysilane; r-glycidoxypropylmethylidiethoxysilane; N-β-(aminoethyl)-r-aminopropyltrimethoxysilane; N-β-(aminoethyl)-r-aminopropylmethyldimethoxysilane; r-aminopropyltriethoxysilane; N-phenyl-r-aminopropyltrimethoxysilane; r-mercaptopropyltrimethoxysilane; and combinations thereof. The organosilane coupling agent used is included in the hardening agent component in an amount capable of sufficiently bonding the resin to the particulate. In some embodiments, the organosilane coupling agent used is included in the hardenable resin component in the range of from about 0.1% to about 3% by weight of the hardening agent component.

Any surfactant compatible with the hardening agent and capable of facilitating the coating of the resin onto particles in the subterranean formation may be used in the hardening agent component. Such surfactants include, but are not limited to, an alkyl phosphonate surfactant (e.g., a C12-C22 alkyl phosphonate surfactant), an ethoxylated nonyl phenol phosphate ester, one or more cationic surfactants, and one or more nonionic surfactants. Mixtures of one or more cationic and nonionic surfactants also may be suitable. The surfactant or surfactants used are included in the liquid hardening agent component in an amount in the range of from about 1% to about 10% by weight of the liquid hardening agent component.

While not required, examples of hydrolysable esters that can be used in the hardening agent component of the integrated consolidation fluids of the present invention include, but are not limited to, a mixture of dimethylglutarate, dimethyladipate, and dimethylsuccinate; sorbitol; catechol; dimethylthiolate; methyl salicylate; dimethyl salicylate; dimethylsuccinate; ter-butylhydroperoxide; and combinations thereof. When used, a hydrolyzable ester is included in the hardening agent component in an amount in the range of from about 0.1% to about 3% by weight of the hardening agent component. In some embodiments a hydrolysable ester is included in the hardening agent component in an amount in the range of from about 1% to about 2.5% by weight of the hardening agent component.

Use of a diluent or liquid carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. Some preferred liquid carrier fluids are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred liquid carrier fluids include aqueous dissolvable solvents such as, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, hexoxyethanol, and isomers thereof. Selection of an appropriate liquid carrier fluid is dependent on the resin composition chosen and is within the ability of one skilled in the art with the benefit of this disclosure.

Furan Resins

Another resin suitable for treatment according to the present disclosure is a furan-based resin. Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use in the furan-based consolidation fluids of the present invention include, but are not limited to isopropyl alcohol, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred.

Phenolic Resins

Still another resin suitable for treatment according to the present disclosure is a phenolic-based resin. Suitable phenolic-based resins include, but are not limited to, terpolymers of phenol, phenolic formaldehyde resins, and a mixture of phenolic and furan resins. Of these, a mixture of phenolic and furan resins is preferred. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol is preferred.

Aqueous-Based Resin Consolidation System

In certain embodiments, the resin treated according to the present disclosure may be introduced through the wellbore in the form of a consolidation fluid comprising an aqueous base, an emulsified resin, and a hardening agent. The aqueous base fluids used in the consolidation fluid may comprise fresh water, saltwater, brine (e.g., saturated saltwater), seawater, or combinations thereof, and may be from any source, provided that they do not contain components that might adversely affect the stability and/or performance of the consolidation fluid. The hardening agent may comprise any of the hardening agents identified above.

Any of the resins identified above may be introduced through the wellbore as an emulsified resin. In some embodiments, the emulsified resin may be emulsified prior to being suspended or dispersed in the aqueous base fluid. By using a resin emulsifier prior to being suspended or dispersed in the aqueous base fluid, particular embodiments may offer the advantage of easier handling and require less preparation in the field. Examples of suitable emulsifying agents may include, but are not limited to, surfactants, proteins, hydrolyzed proteins, lipids, glycolipids, and nan-sized particulates, such as fumed silica.

Generally, the emulsified resin may be provided in any suitable form, including particle form, which may be a solid and/or liquid. In those embodiments where the resin is provided in a particle form, the size of the particle can vary widely. In some embodiments, the resin particles may have an average particle diameter of about 0.01 micrometers ("μm") to about 500 μm. In some embodiments, the resin particles may have an average particle diameter of about 0.1 μm to about 100 μm. In some embodiments, the resin particle may have an average particle diameter of about 0.5 μm to about 10 μm. The size distribution of the resin particles used in a particular composition or method may depend upon several factors including, but not limited to, the size distribution of the particulates present in the subterranean formation, the effective porosity and/or permeability of the subterranean formation, pore throat size and distribution, and the like.

Treatment of the Cured Resin

In certain embodiments, the uncured resin or its constituent components are introduced through the wellbore to the unconsolidated subterranean formation. The resin is then cured using methods that are known in the art. Curing refers to the toughening or hardening of a resin material by cross-linking the molecular chains, and this can be brought about by chemical additives such as a hardener in presence of heat, catalysts, ultraviolet radiation, or an electron beam. The cured resin consolidates the subterranean formation and may coat the surface of the wellbore. The resin may also form a consolidated pack of cured resin and particulate. In certain embodiments, the cured resin treated using methods of the present disclosure may not be completely hardened but may be at least partially cured in a manner that provides some degree of consolidation of the particulates with which it interacts.

All or a portion of the cured resin may subsequently be removed by using a chemical solvent. The chemical solvent is introduced through the wellbore after the resin is cured. This solvent contacts the cured resin and/or consolidated pack and at least partially dissolves it. In certain cases, the cured resin may be completely dissolved. The dissolved resin and consolidated pack may then be safely removed from the wellbore. For example, the chemical solvent may be pumped to the surface of the wellbore directly. Alternatively, a well servicing fluid (e.g., a drilling fluid) may be circulated in the wellbore to remove the chemical solvent and dissolved resin.

The chemical solvent is placed into contact with the resin and/or consolidated pack for a duration of time sufficient to at least partially dissolve the resin and/or consolidated pack. In one embodiment, the chemical solvent is placed into contact with the resin and/or consolidated pack for up to 96 hours. In another embodiment, the chemical solvent is placed into contact with the resin and/or consolidated pack for as long 120 hours. With the benefit of this disclosure, a person of skill in the art can determine the optimal amount of time for the chemical solvent to be in contact with the resin based on, for example, the type of resin used, the temperature and/or pressure conditions in the well bore, and/or other factors. With the benefit of the disclosure, a person of skill in the art may adjust the amount of time during the course of a treatment depending upon, for example, the observed progress of the treatment and/or other factors.

The chemical solvent may be introduced into the wellbore with or without a carrier fluid. When used, the carrier fluid may comprise any fluid that is not incompatible with the chemical solvent. Examples of suitable carrier fluids include water, brine, alcohols, ethers, and other liquids in which the chemical solvent is miscible. In most circumstances, strong acids, strong bases, oxidizers, and reducing agents should be avoided. In one embodiment, the chemical solvent comprises about 0.5% to 100% of the fluid in the wellbore by mass. In a preferred embodiment, the chemical solvent comprises about 50% to 100% of the fluid in the wellbore by mass.

A variety of chemical solvents may be used to at least partially dissolve the cured resin and/or consolidated pack. Examples of solvents that may be suitable for use in the methods of the present disclosure include, but are not limited to, dibasic esters, ketones, tetra hydro furan, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, butylene carbonate, propylene carbonate, ethylene carbonate, methanol, butyl alcohol, d-limonene, fatty acid methyl ester, caprolactone, γ-valerolactone, δ-decalactone, cyclohexylpyrrolidone, β-propiolactone, 3-oxetanone, combinations thereof, and derivatives thereof.

In a preferred embodiment, the chemical solvent comprises γ-butyrolactone ("BLO"). Advantages of BLO may include, among other things, its easy availability and favorable chemical, physical, and environmental properties. For example, BLO is a water-soluble oily liquid with pleasant odor. It has a high boiling point of 206° C. (399° F.) and a flash point of 98° C. (199.4° F.). Moreover, BLO is found to be readily biodegradable. BLO has a low order of toxicity, and its hydrolysis product (γ-Hydroxybutyrate) is predicted to have even lower toxicity.

Treating a cured resin with a chemical solvent according to the methods of the present disclosure may remove permanent damage caused by excess and improper resin treatments. In certain embodiments, the methods of the present disclosure may be used to remove resin from downhole equipment including, but not limited to, screens and tubing. Moreover, in certain embodiments, these methods may be performed without any preflush (conditioning) fluids before the solvent treatment as the solvent is compatible with hydrocarbons. In other embodiments, preflush fluids or treatments may be used. The methods of the present disclosure can be used to save the cost of replacing tubular and completion parts.

In certain embodiments, the methods of the present disclosure may be used to facilitate the isolation and treatment of a particular zone in the wellbore and/or subterranean formation. For example, a resin may be introduced into the wellbore to form a plug and subsequently allowed to cure. This cured resin plug may be used to isolate a zone of the wellbore and/or subterranean formation. In certain embodiments, a particular zone of the wellbore may be treated according to methods known in the art. Following treatment, the cured resin plug may be removed according to the methods of the present disclosure.

To facilitate a better understanding of the present disclosure, the following examples of certain aspects of some embodiments are given. In no way should the following examples be read to limit or define the scope of the invention.

EXAMPLES

Example 1

Four consolidated sand cubes (2×2×2 inches) were prepared using Expedite® 225, Expedite® 350, SandTrap® 225 and SandTrap® 350 respectively (resins available from Halliburton Energy Services, Inc.). The amount of resin used was 20 ml (10 ml Part A+10 ml Part B) into 200 gm of 20/40 sand in all cases. The cube molds were kept at temperature for curing. The amount of resin used for consolidation was in excess then recommended volume. Each sand cube was cut into four parts. One part was used for unconfined compressive strength ("UCS") measurement while the remaining three parts were used for dissolution study. Details of curing temperature and UCS values are provided in Table 1 below.

TABLE 1

Compressive Strength of Consolidated Sand Cubes and Curing Temperature

| Resain System | Curing Temp. (° F.) | UCS Values (psi) |
|---|---|---|
| Expedite ® 225 | 158 | 3460 |
| Expedite ® 350 | 199.4 | 1560 |
| SandTrap ® 225 | 158 | 1699 |
| SandTrap ® 350 | 199.4 | 501 |

To evaluate the dissolution action of BLO, samples of the consolidated sand cubes were placed into BLO. The initial dissolution study was conducted at room temperature (75° F.) using 50 ml of BLO. In subsequent tests, the temperature was increased and the volume of BLO was also changed.

FIG. 1 shows representative sand cube dissolution illustrations. State I is defined where a small fraction of cured resin cube is dissolved in BLO. The cube retains its shape although it becomes brittle. State II is defined where partial dissolution/integrity of the cube is lost and it collapses into pieces and sand. The pieces are brittle in nature.

Table 2 summarizes the test results of the dissolution studies.

TABLE 2

Summary of Consolidated Sand Cube Dissolution Test with BLO

| Resin System | Volume of BLO Used | Test temperature | Observation |
|---|---|---|---|
| Expedite ® 225 | 50 ml | 75° F. | State I after 72 hrs. |
| | 50 ml | 150° F. | State II after 72 hrs. |
| | 70 ml | 176° F. | Complete dissolution after 24 hrs. |
| Expedite ® 350 | 50 ml | 75° F. | State II after 24 hrs. |
| | 50 ml | 176° F. | State II after 5 hrs. |
| | 70 ml | 212° F. | Complete dissolution after 3 hrs. |
| SandTrap ® 225 | 50 ml | 75° F. | State I after 72 hrs. |
| | 50 ml | 150° F. | State II after 72 hrs. |
| | 70 ml | 176° F. | Complete dissolution after 24 hrs. |
| SandTrap ® 350 | 50 ml | 75° F. | State II after 24 hrs. |
| | 50 ml | 176° F. | Most fraction of cube was disintegrated after 5 hrs. |
| | 70 ml | 212° F. | Complete dissolution after 2 hrs. |

Thus, Example 1 illustrates that BLO effectively dissolves formations that have been consolidated using a variety of cured resins.

Example 2

To simulate a subterranean formation, a sandpack with 30/50 silica sand was prepared in a brass cell. An experiment was set up as follows to measure the pressure drop and permeability.

At the first stage, the untreated sandpack was evaluated. The permeability and pressure drop of the initial sandpack were measured with diesel.

At the second stage, the consolidated sandpack was evaluated. Two pore volume (PV) of SandTrap® 225 (1 PV part A+1 PV Part B) was pumped into the pack. The treated pack was kept at 196° C. for 3 days. After curing, the pressure drop and permeability of the consolidated sandpack were measured with diesel.

At the third stage, the BLO-treated sandpack was evaluated. Consolidated sandpacks were treated with two PV of BLO. The treated sandpack was kept at 196° C. for 30 hrs. The pressure drop and permeability were then measured with diesel.

Figure 1A:
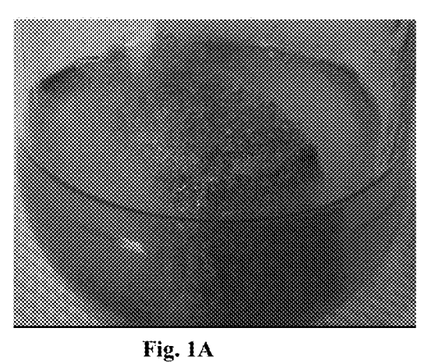
FIG. 1A shows the Initial State.
Figure 1B:
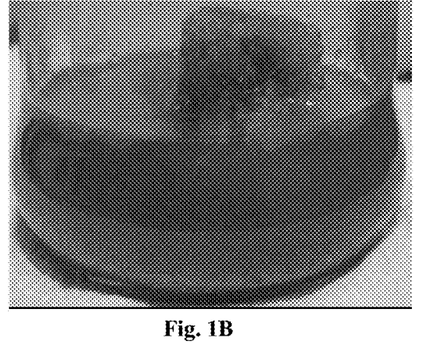
FIG. 1B shows State-I.
Figure 1C:
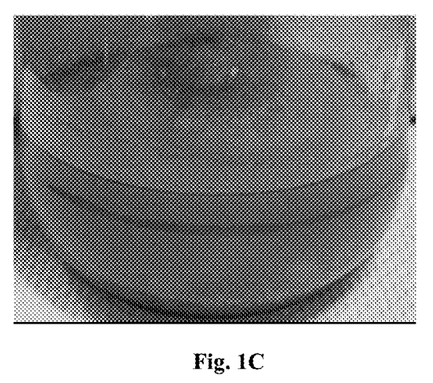
FIG. 1C shows State-II.
Figure 1D:
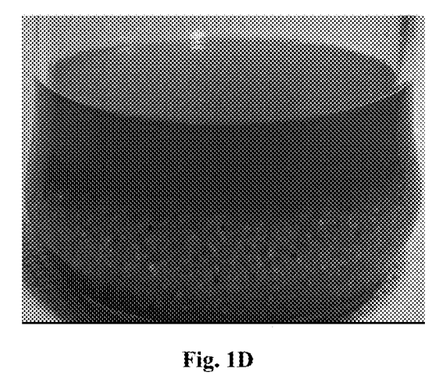
FIG. 1D shows complete dissolution.
Figure 2:
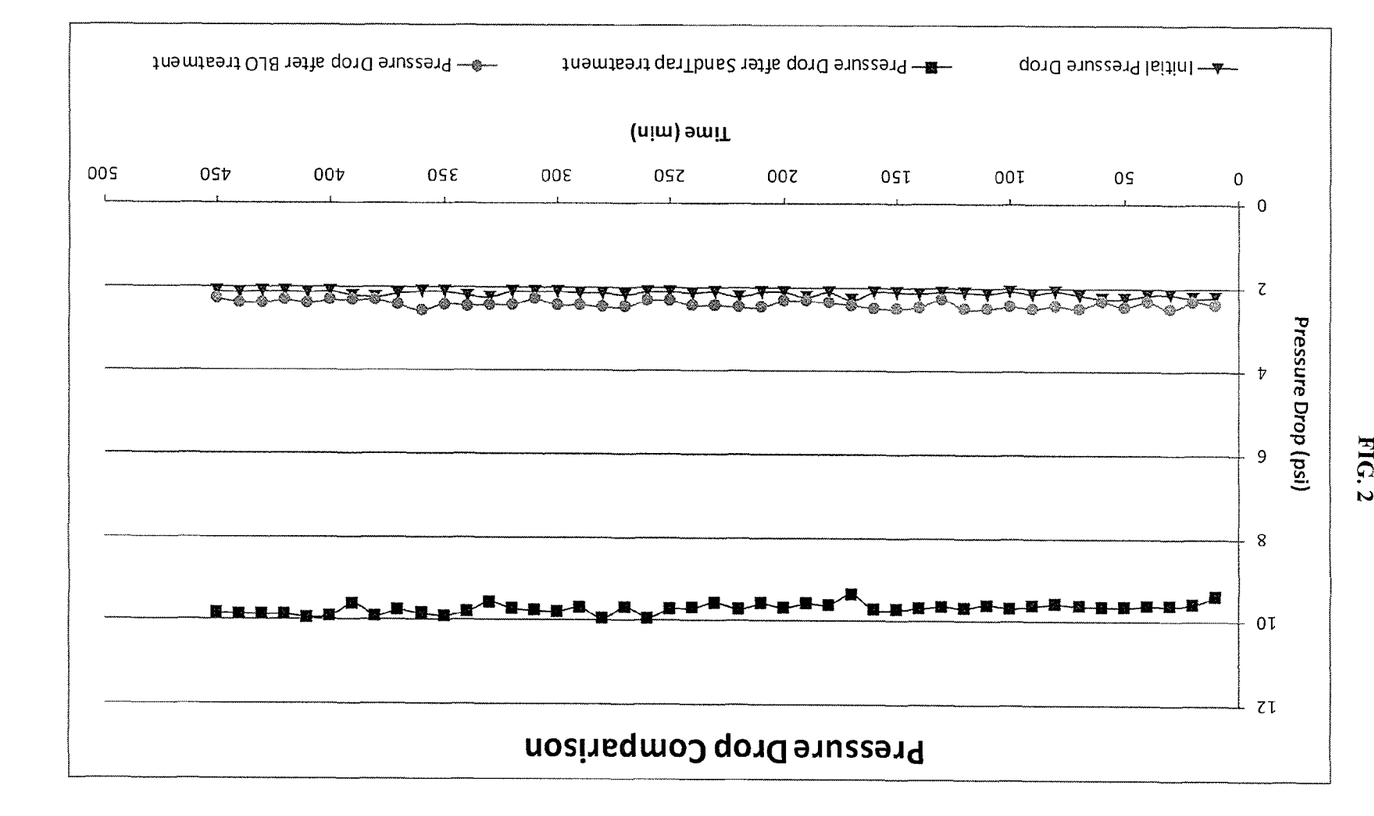
FIG. 2 is a graph illustrating data regarding the pressure drop experienced by one example of a sandpack at three different stages: i) an initial stage, ii) the stage after the sandpack is consolidated with a cured SandTrap® 225 resin, and iii) the stage after the sandpack is treated with γ-butyrolactone ("BLO").
Figure 3:
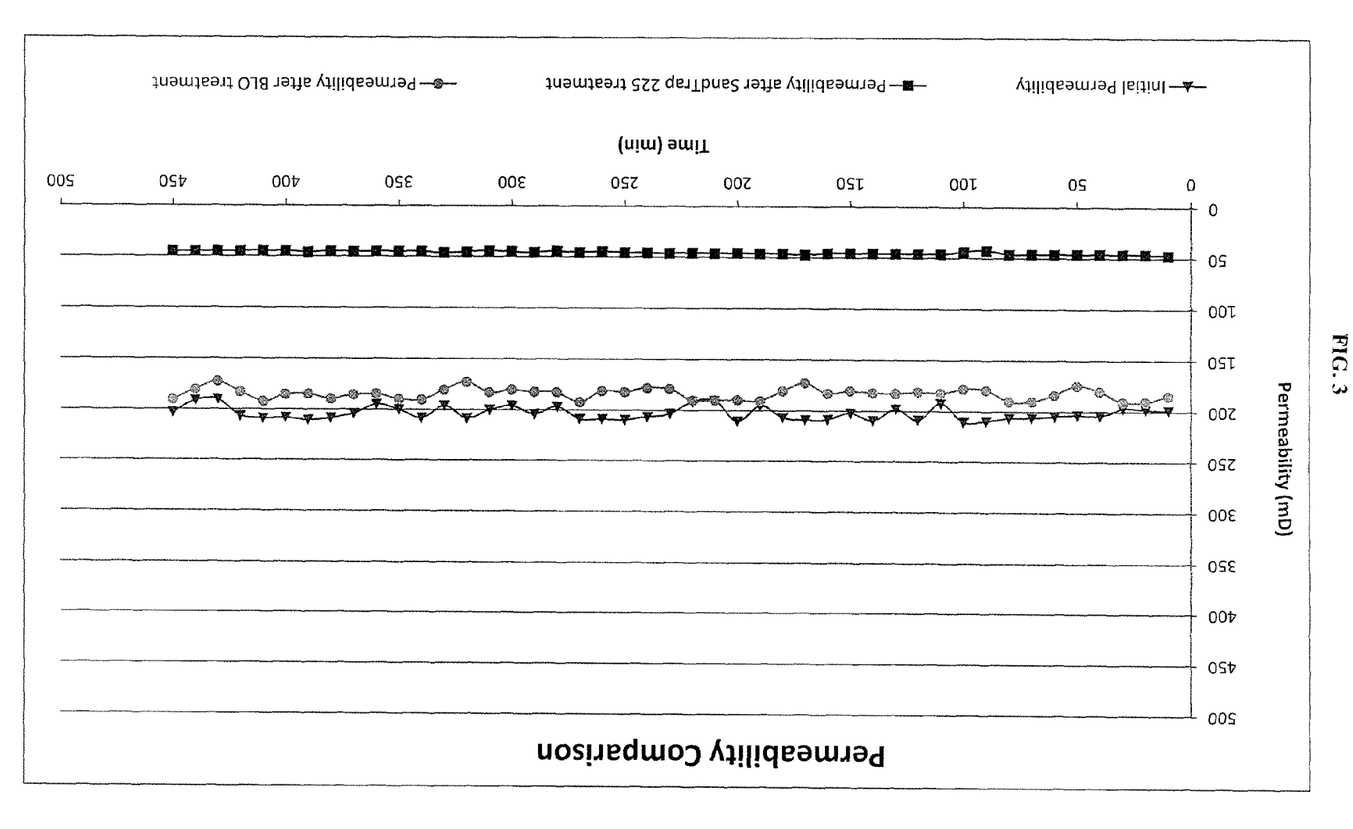
FIG. 3 is a graph illustrating data regarding the permeability of one example of a sandpack at three different stages: i) an initial stage, ii) the stage after the sandpack is consolidated with a cured SandTrap® 225 resin, and iii) the stage after the sandpack is treated with BLO.

The recorded pressure drop and permeability of the sandpack initially, after consolidation, and after BLO-treatment are plotted in FIGS. 2 and 3. FIG. 2 illustrates the pressure drop at each of the stages. FIG. 3 illustrates the permeability at each of the stages. It is evident that the BLO treatment was able to remove the cured resin under the subterranean-simulated conditions and the BLO solvent is able reduce the high pressure drop of the consolidated sandpack.

Example 3

To simulate a subterranean formation, a sandpack with 100 mesh SSA-II+200 mesh SSA-I and Bentonite clay was prepared in a brass cell. An experiment was set up as follows to measure the pressure drop and permeability.

At the first stage, the untreated sandpack was evaluated. The permeability and pressure drop of the initial sandpack were measured with 7% KCl.

At the second stage, the consolidated sandpack was evaluated. Eight pore volume (PV) of SandTrap® ABC (4.2% Part-A+4.2% Part-B+3.6% Part-C prepared in 7% KCl) was pumped into the pack. The treated pack was kept for curing at 190° F. for 24 hours. After curing, the pressure drop and permeability of the consolidated sandpack was measured with 7% KCl.

At the third stage, the BLO-treated sandpack was evaluated. The consolidated sandpack was treated with four PV of BLO. This treated sandpack was kept at 190° F. for 24 hours. The pressure drop and permeability were then measured with 7% KCl.

Figure 4:
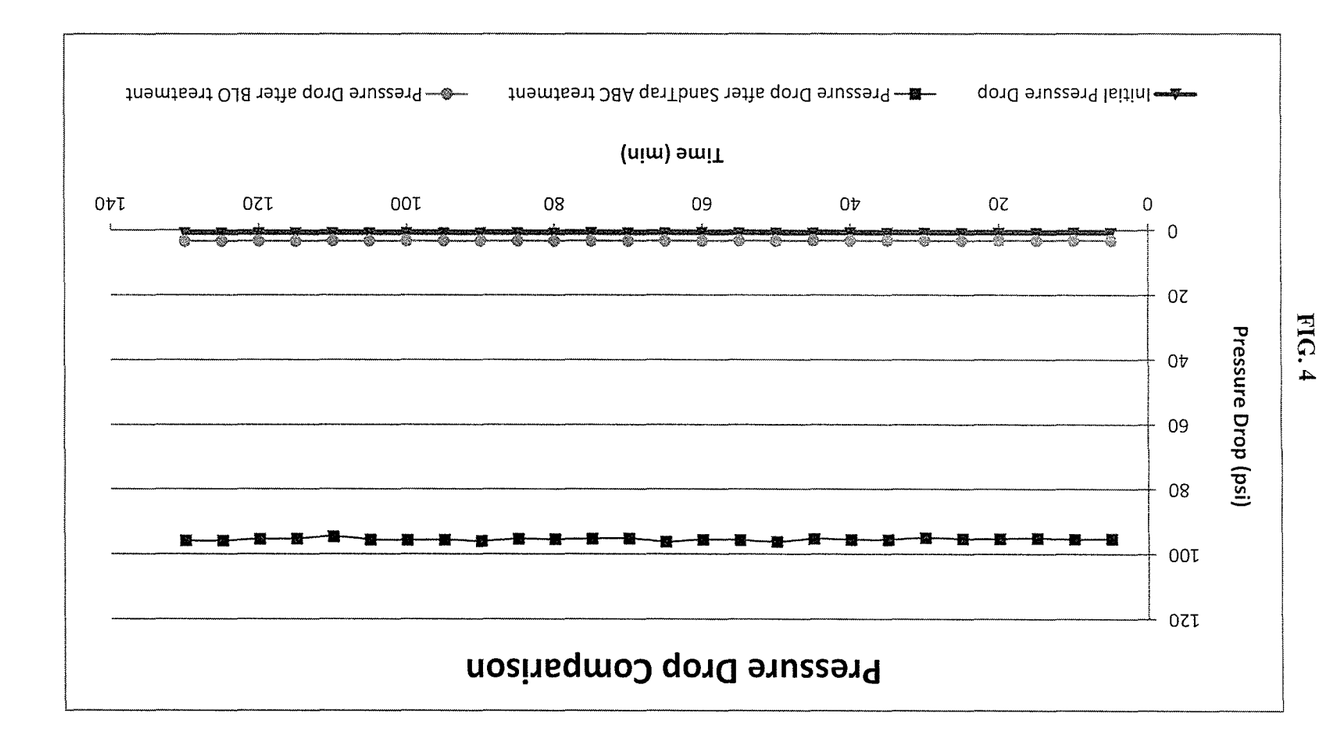
FIG. 4 is a graph illustrating data regarding the pressure drop experienced by one example of a sandpack at three different stages: i) an initial stage, ii) the stage after the sandpack is consolidated with a cured SandTrap® ABC resin, and iii) the stage after the sandpack is treated with BLO.
Figure 5:
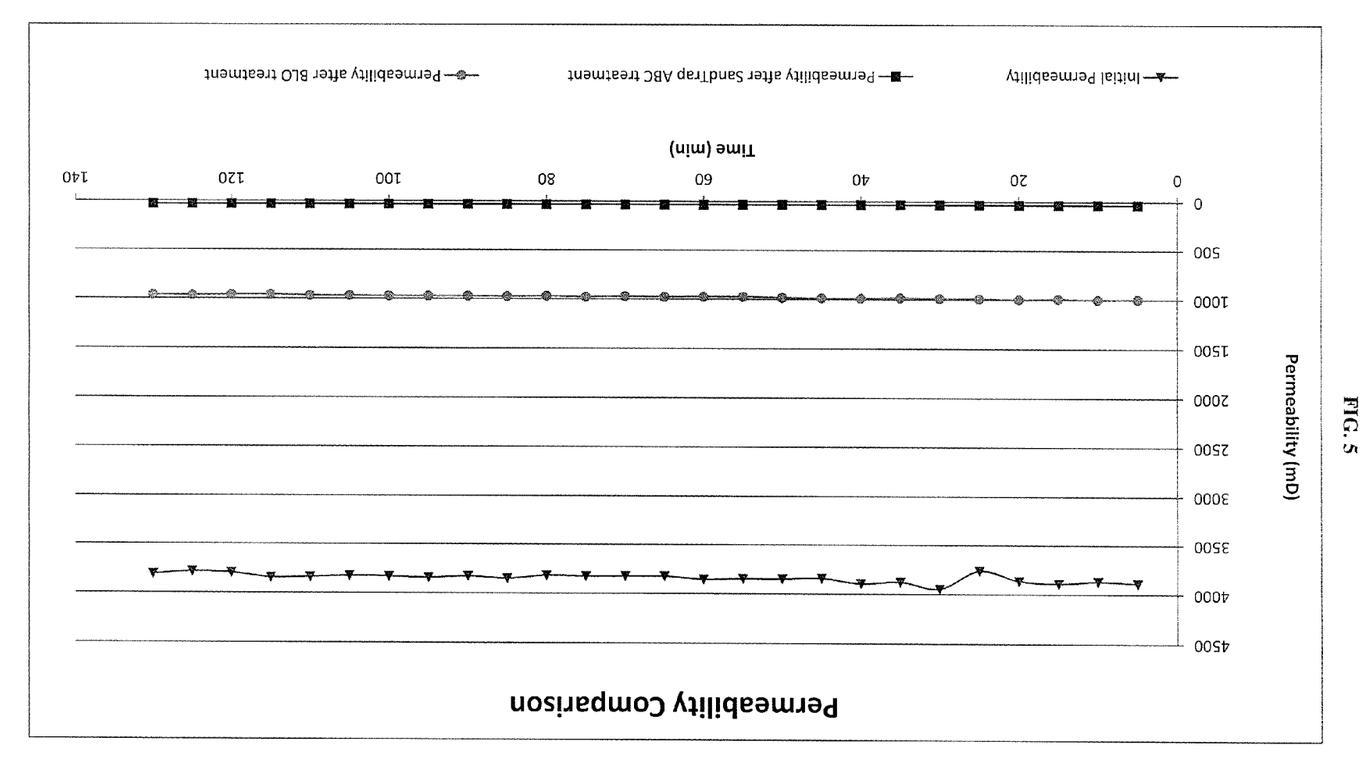
FIG. 5 is a graph illustrating data regarding the permeability of a one example of a sandpack at three different stages: i) an initial stage, ii) the stage after the sandpack is consolidated with a cured SandTrap® ABC resin, and iii) the stage after the sandpack is treated with BLO.

The recorded pressure drop and permeability of the sandpack initially, after consolidation, and after BLO-treatment are plotted in FIGS. 4 and 5. FIG. 4 illustrates the pressure drop at each of the stages. FIG. 5 illustrates the permeability at each of the stages. It is evident that the BLO treatment was able to remove the cured resin under the subterranean-simulated conditions and the BLO solvent is able to reduce the high pressure drop of the consolidated sandpack.

Thus, Examples 2 and 3 illustrates that treatment with BLO can effectively unconsolidate the subterranean formation by reversing the effect of the cured resin.

Example 4

Figure 6A:
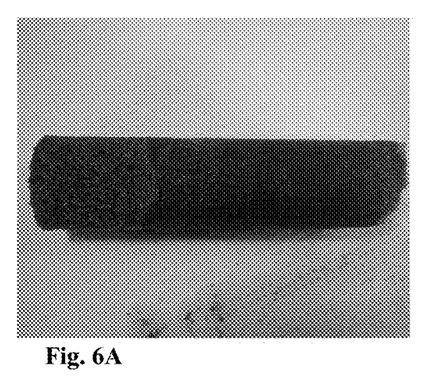
Figure 6B:
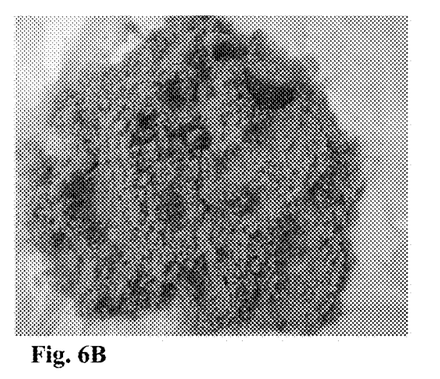

To further understand the effect of BLO on a consolidated sandpack, two similar sandpacks were prepared and consolidated. Then, one was treated with BLO while the other was not. As shown in FIG. 6, the treatment with BLO destroyed the integrity of the consolidated sandpack. Accordingly, the BLO treatment is able to remove cured resin from subterranean formation.

Example 4 further illustrates that treatment with BLO can undo the effect of consolidation by a resin.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

An embodiment of the present disclosure is a method comprising: introducing a chemical solvent into a wellbore penetrating a portion of a subterranean formation wherein a resin has been at least partially cured; wherein the chemical solvent is selected from the group consisting of γ-butyrolactone, dibasic esters, ketones, tetra hydro furan, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, butylene carbonate, propylene carbonate, ethylene carbonate, methanol, butyl alcohol, d-limonene, fatty acid methyl ester, caprolactone, γ-valerolactone, δ-decalactone, cyclohexylpyrrolidone, β-propiolactone, 3-oxetanone, any combination thereof, and any derivative thereof; contacting the resin with the chemical solvent to at least partially dissolve the resin; and circulating a fluid in the wellbore to remove the resin from the wellbore. Optionally, the chemical solvent comprises γ-butyrolactone. Optionally, the resin comprises a two-component epoxy resin. Optionally, the resin is contacted with the chemical solvent for at least 30 minutes. Optionally, the chemical solvent is introduced into the wellbore using a carrier fluid, wherein the chemical solvent is present in the carrier fluid in a range of about 0.5% to about 99%.

Another embodiment of the present disclosure is a method comprising: introducing a chemical solvent into a wellbore penetrating a consolidated portion of a subterranean formation that has been at least partially consolidated with a resin; wherein the chemical solvent is selected from the group consisting of γ-butyrolactone, dibasic esters, ketones, tetra hydro furan, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, butylene carbonate, propylene carbonate, ethylene carbonate, methanol, butyl alcohol, d-limonene, fatty acid methyl ester, caprolactone, γ-valerolactone, δ-decalactone, cyclohexylpyrrolidone, β-propiolactone, 3-oxetanone, any combination thereof, and any derivative thereof; contacting the consolidated portion of the subterranean formation with the chemical solvent to at least partially unconsolidate the consolidated portion of the subterranean formation. Optionally, the chemical solvent comprises γ-butyrolactone. Optionally, the resin comprises a two-component epoxy resin. Optionally, the formation is contacted with the chemical solvent for at least 30 minutes. Optionally, the chemical solvent is introduced into the wellbore using a carrier fluid, wherein the chemical solvent is present in the carrier fluid in a range of about 0.5% to about 99%.

Another embodiment of the present disclosure is a method comprising: introducing a resin into a wellbore; at least partially curing the resin to produce a cured resin; introducing a chemical solvent into the wellbore; contacting at least a portion of the cured resin with the chemical solvent to at least partially dissolve at least a portion the cured resin; and using a circulated fluid to remove the dissolved resin from the wellbore. Optionally, method further comprises isolating a zone of the wellbore with the cured resin prior to introducing the chemical solvent into the wellbore. Optionally, the method further comprises treating a zone of the wellbore that has been isolated by the cured resin. Optionally, the chemical solvent comprises γ-butyrolactone. Optionally, the chemical solvent is selected from the group consisting of dibasic esters, ketones, tetra hydro furan, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, butylene carbonate, propylene carbonate, ethylene carbonate, methanol, butyl alcohol, d-limonene, fatty acid methyl ester, caprolactone, γ-valerolactone, δ-decalactone, cyclohexylpyrrolidone, β-propiolactone, 3-oxetanone, any combination thereof, and any derivative thereof. Optionally, the resin comprises a two-component epoxy resin. Optionally, the formation is contacted with the chemical solvent for at least 30 minutes. Optionally, the chemical solvent is introduced into the wellbore using a carrier fluid, wherein the chemical solvent is present in the carrier fluid in a range of about 0.5% to about 99%. Optionally, the portion of the resin contacted with the chemical solvent is attached to or resides within downhole equipment. Optionally, the downhole equipment is selected from the group consisting of screens and tubing.

What is claimed is:

1. A method comprising:
   introducing a chemical solvent into a wellbore penetrating a portion of a subterranean formation wherein a resin has been at least partially cured;
   wherein the chemical solvent is selected from the group consisting of γ-butyrolactone, dibasic esters, ketones, tetra hydro furan, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, butylene carbonate, propylene carbonate, ethylene carbonate, methanol, butyl alcohol, d-limonene, fatty acid methyl ester, caprolactone, γ-valerolactone, δ-decalactone, cyclohexylpyrrolidone, β-propiolactone, 3-oxetanone, any combination thereof, and any derivative thereof;
   contacting the resin with the chemical solvent to at least partially dissolve the resin; and
   circulating a fluid in the wellbore to remove the resin from the wellbore.

2. The method of claim 1 wherein the chemical solvent comprises γ-butyrolactone.

3. The method of claim 1 wherein the resin comprises a two-component epoxy resin.

4. The method of claim 1 wherein the resin is contacted with the chemical solvent for at least 30 minutes.

5. The method of claim 1 wherein the chemical solvent is introduced into the wellbore using a carrier fluid, wherein the chemical solvent is present in the carrier fluid in a range of about 0.5% to about 99%.

6. A method comprising:
   introducing a chemical solvent into a wellbore penetrating a consolidated portion of a subterranean formation that has been at least partially consolidated with a resin;
   wherein the chemical solvent is selected from the group consisting of γ-butyrolactone, dibasic esters, ketones, tetra hydro furan, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, butylene carbonate, propylene carbonate, ethylene carbonate, methanol, butyl alcohol, d-limonene, fatty acid methyl ester, caprolactone, γ-valerolactone, δ-decalactone, cyclohexylpyrrolidone, β-propiolactone, 3-oxetanone, any combination thereof, and any derivative thereof; and
   contacting the consolidated portion of the subterranean formation with the chemical solvent to at least partially unconsolidate the consolidated portion of the subterranean formation.

7. The method of claim 6 wherein the chemical solvent comprises γ-butyrolactone.

8. The method of claim 6 wherein the resin comprises a two-component epoxy resin.

9. The method of claim 6 wherein the formation is contacted with the chemical solvent for at least 30 minutes.

10. The method of claim 6 wherein the chemical solvent is introduced into the wellbore using a carrier fluid, wherein the chemical solvent is present in the carrier fluid in a range of about 0.5% to about 99%.

11. A method comprising:
    introducing a resin into a subterranean formation;
    at least partially curing the resin to produce a cured resin;
    introducing a chemical solvent into the subterranean formation;
    contacting at least a portion of the cured resin with the chemical solvent to at least partially dissolve at least a portion the cured resin; and
    using a circulated fluid to remove the dissolved resin from the subterranean formation.

12. The method of claim 11 that further comprises isolating a zone of the subterranean formation with the cured resin prior to introducing the chemical solvent into the subterranean formation.

13. The method of claim 12 that further comprises treating a zone of the subterranean formation that has been isolated by the cured resin.

14. The method of claim 11 wherein the chemical solvent comprises γ-butyrolactone.

15. The method of claim 11 wherein the chemical solvent is selected from the group consisting of dibasic esters, ketones, tetra hydro furan, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, butylene carbonate, propylene carbonate, ethylene carbonate, methanol, butyl alcohol, d-limonene, fatty acid methyl ester, caprolactone, γ-valerolactone, δ-decalactone, cyclohexylpyrrolidone, β-propiolactone, 3-oxetanone, any combination thereof, and any derivative thereof.

16. The method of claim 11 wherein the resin comprises a two-component epoxy resin.

17. The method of claim 11 wherein the formation is contacted with the chemical solvent for at least 30 minutes.

18. The method of claim 11 wherein the chemical solvent is introduced into the subterranean formation using a carrier fluid, wherein the chemical solvent is present in the carrier fluid in a range of about 0.5% to about 99%.

19. The method of claim 11 wherein the portion of the resin contacted with the chemical solvent is attached to or resides within downhole equipment.

20. The method of claim 19 wherein the downhole equipment is selected from the group consisting of screens and tubing.

* * * * *